(12) United States Patent
Abu-Alqumsan et al.

(10) Patent No.: US 10,956,489 B2
(45) Date of Patent: *Mar. 23, 2021

(54) VISUAL LOCALIZATION METHOD

(71) Applicant: NavVis GmbH, Munich (DE)

(72) Inventors: Mohammad Abu-Alqumsan, Munich (DE); Anas Al-Nuaimi, Munich (DE); Robert Huitl, Munich (DE); Georg Schroth, Munich (DE); Florian Schweiger, Rohrbach (DE); Eckehard Steinbach, Munich (DE)

(73) Assignee: NavVis GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,850

(22) Filed: Jan. 29, 2020

(65) Prior Publication Data

US 2020/0167382 A1 May 28, 2020

Related U.S. Application Data

(63) Continuation of application No. 16/259,618, filed on Jan. 28, 2019, now Pat. No. 10,585,938, which is a
(Continued)

(30) Foreign Application Priority Data

Aug. 10, 2010 (EP) .................................... 10172403

(51) Int. Cl.
*G06F 16/583* (2019.01)
*G06F 16/29* (2019.01)
(Continued)

(52) U.S. Cl.
CPC .......... *G06F 16/5854* (2019.01); *G06F 16/29* (2019.01); *G06F 16/51* (2019.01);
(Continued)

(58) Field of Classification Search
CPC ......... G06F 17/30259; G06F 17/30241; G06F 17/3028; G06F 16/5854; G06F 16/29;
(Continued)

(56) References Cited

U.S. PATENT DOCUMENTS 7,475,071 B1   1/2009 Liu et al.
7,539,657 B1 * 5/2009 Liu ..................... G06K 9/6276
                                                        706/45
(Continued)

FOREIGN PATENT DOCUMENTS

WO   2007130688 A2   11/2007
WO   2010075155 A2    7/2010

OTHER PUBLICATIONS

Hile, Harlan, et al., Positioning and Orientation in Indoor Environments Using Camera Phones, IEEE Computer Graphics and Applications, Jul. 2008, pp. 32-39, USA.
(Continued)

*Primary Examiner* — Asghar H Bilgrami
(74) *Attorney, Agent, or Firm* — Budzyn IP Law, LLC

(57) ABSTRACT

There is provided a visual localization method comprising: (a) transmitting data representative of one or more detected visual features from a mobile device to a server; (b) estimating the location of the mobile device at the server based on the visual features received from the mobile device; (c) transmitting reference data associated with the estimated location from the server to the mobile device; and (d) the mobile device determining its location based on the reference data received from the server.

6 Claims, 9 Drawing Sheets

Related U.S. Application Data continuation of application No. 15/910,247, filed on Mar. 2, 2018, now Pat. No. 10,229,136, which is a continuation of application No. 15/473,284, filed on Mar. 29, 2017, now Pat. No. 9,946,733, which is a continuation of application No. 13/816,093, filed as application No. PCT/EP2011/057901 on May 16, 2011, now Pat. No. 9,641,981.

(51) Int. Cl.
*G06F 16/51* (2019.01)
*G06K 9/62* (2006.01)
*G06Q 30/06* (2012.01)
*H04W 4/02* (2018.01)

(52) U.S. Cl.
CPC ......... *G06F 16/583* (2019.01); *G06K 9/6215* (2013.01); *G06Q 30/0623* (2013.01); *H04W 4/025* (2013.01)

(58) Field of Classification Search
CPC ..... G06F 16/51; G06F 16/583; G06K 9/6215; G06Q 30/0623; H04W 4/025
See application file for complete search history.

(56) References Cited

U.S. PATENT DOCUMENTS

| | | | |
|---|---|---|---|
| 7,627,166 B2* | 12/2009 | Shah | G06K 9/4647 382/162 |
| 8,213,957 B2* | 7/2012 | Bull | G01S 5/02 370/328 |
| 8,942,483 B2* | 1/2015 | Janky | G01C 15/00 382/195 |
| 2003/0095681 A1 | 5/2003 | Burg et al. | |
| 2007/0076950 A1* | 4/2007 | Shah | G06K 9/00456 382/170 |
| 2007/0112729 A1 | 5/2007 | Wiseman et al. | |
| 2008/0226130 A1* | 9/2008 | Kansal | G06F 16/58 382/106 |
| 2008/0249898 A1* | 10/2008 | Ratnakar | G06Q 30/0641 705/27.1 |
| 2009/0138376 A1 | 5/2009 | Smyers et al. | |
| 2010/0151901 A1 | 6/2010 | Roden et al. | |
| 2012/0069131 A1* | 3/2012 | Abelow | G06Q 10/067 348/14.01 |
| 2013/0243250 A1* | 9/2013 | France | G06K 9/46 382/103 |

OTHER PUBLICATIONS

Yang, Heng, et al., Distance-Based Multiple Paths Quantization of Vocabulary Tree for Object and Scene Retrieval, Computer Vision—ACCV 2009: 9th Asian Conference on Computer Vision, Xi'an, China, Sep. 23-27, 2009, revised selected papers, Berlin [U.A.]: Springer, DE, pp. 313-322.

International Search Report and Written Opinion of the International Searching Authority for PCT/EP2011/057901, dated Aug. 9, 2011 (11 pages).

* cited by examiner (b) Probability of separating matching descriptors (a) Matched descriptor distance histogram

VISUAL LOCALIZATION METHOD

CROSS-REFERENCES TO RELATED APPLICATIONS

This application is a continuation of U.S. patent application Ser. No. 16/259,618, filed Jan. 28, 2019, now allowed, which is a continuation of U.S. patent application Ser. No. 15/910,247, filed Mar. 2, 2018, now U.S. Pat. No. 10,229,136, which is a continuation of U.S. patent application Ser. No. 15/473,284, filed on Mar. 29, 2017, now U.S. Pat. No. 9,946,733, which is a continuation of U.S. patent application Ser. No. 13/816,093, filed Jul. 9, 2013, now U.S. Pat. No. 9,641,981, which is a National Stage filing under 35 U.S.C. § 371 of PCT Application No. PCT/EP2011/057901, filed May 16, 2011, which claims priority to European Patent Application No. 10172403.7, filed Aug. 10, 2010, the contents of which are incorporated by reference herein.

BACKGROUND

Information about the location, orientation, and context of a mobile device is of central importance for future multimedia applications and location-based services (LBS). With the widespread adoption of modern camera phones, including powerful processors, inertial measurement units, compass, and assisted GPS receivers, the variety of location and context-based services has significantly increased over the last years. These include, for instance, the search for points of interest in the vicinity, geo tagging and retrieval of user generated media, targeted advertising, navigation systems, social applications etc.

While satellite navigation systems can provide sufficient positioning accuracy, a clear view to at least four satellites is required, limiting its applicability to outdoor scenarios with few obstacles. Unfortunately, most interesting LBS could be provided in densely populated environments, which include urban canyons and indoor scenarios. Problems may be caused by multipath effects, which are even more severe if the user is traveling on the sidewalks and not in the middle of the street.

As GPS is virtually not available in indoor environments and the localization accuracy in urban canyons is insufficient, alternative positioning mechanisms, which can complement the available systems, are required.

One approach may consist in using images recorded on the mobile device as a visual fingerprint of the environment and matching them to an existing georeferenced database like Google Street View or Microsoft Street-Side views. In contrast to WiFi based indoor localization systems, no infrastructure, which grows in complexity with the size of the environment, is required. Further, LBS do not only rely on a precise location and orientation information to determine the user's actual field of view but also benefit from information on its content like exhibits, store names, trademarks, etc., which can be derived from the images the user is intentionally recording. Ideally, the pose information from visual localization is fused with all other available sensor data providing location or orientation like GPS, IMU, WiFi, or Cell-IDs if available.

The main challenge for visual localization is to rapidly and accurately search for images related to the current recording in a large georeferenced database. This task is known as Content Based Image Retrieval (CBIR). Objects, recorded at different size, pose, and with varying background have to be distinctively described and efficiently retrieved from a database. The application of CBIR to location recognition complicates these requirements.

In particular, images captured with a mobile device are used to retrieve the spatially closest image from a georeferenced dataset. This could, for instance, include the 360° panoramic images from Google Street View, which can be fetched from the web. Typically, only sparse reference data can be assumed. For instance, Street View panoramas are available online with varying inter-panorama distances, typically in the range of 12 to 17 m. However, there are problems associated with wide baselines. Whereas distant buildings can be well associated among the views, close objects like the train station or the tree are difficult to match even for a human observer. The description of distinct objects is complicated due to the three-dimensional structure of the environment and the resulting occlusions and overlaps. Further, different lighting conditions between the query and database image, which cause shadows and reflections, can change the visual appearance of the scene. Also, both query and database images typically contain dynamic objects, like cars or pedestrians, which lead to significant differences between matching views. As advertisements or even buildings alter over time and seasons change the appearance dramatically, a dynamic update process for the database is required. Due to the properties of mobile device cameras, query images are typically affected by motion blur and provide a limited field of view, which makes it difficult to match them against high resolution panoramas. Additionally, limitations on the processing power, battery capacity, and network performance require low complexity approaches on the mobile device and efficient communication including data compression.

Finally, very low retrieval times are an essential prerequisite for most LBS due to the rapidly changing field of view of the mobile device caused by user motion and constantly changing user attention.

Whilst there are different known image retrieval algorithms, the major bottleneck is the communication delay introduced by feature uploading. Including network delay, communication timeouts, and the retrieval itself, the delay until the client receives results from the server may be insufficient for some location-based services due to user motion and dynamically changing user attention.

Accordingly, in one embodiment the present invention aims to address two central challenges of mobile visual location recognition, namely the complex retrieval task and the communication delay.

Moreover, in order to achieve the required low query time, tree-based bag-of-feature (BOF) approaches are typically used, which quantize image descriptors into visual words.

The retrieval of images or image sequences in large databases has been studied extensively during the last decades. Object retrieval and location recognition are among the most known applications in this field. While image retrieval results can be efficiently improved via Bayesian filtering in location recognition scenarios, the requirements on the query time are very stringent. A typical example would be an online service providing location information based on image recordings from mobile devices and a geo-tagged reference image database like Google Street View. In this scenario, images are typically dimensionality reduced on the mobile device with the aid of robust features like SIFT or SURF. The extracted features are sent to a server, which has to compute the position estimate within a few milliseconds to meet the stringent real-time requirements of mobile location recognition. The ability to rapidly estimate the absolute location is essential to continuously limit the temporally increasing uncertainty of the user's position and thus the computational complexity.

In feature based retrieval approaches, the similarity of images is typically determined by a score based on the count of matching high dimensional feature descriptors. To avoid a query time, which scales linearly with the number of database images, efficient indexing structures like the popular kd-tree are typically used. These trees perform an approximate k-nearest neighbor search to achieve query times lower than the one obtained for a linear search for dimensions higher than 10. However, backtracking through neighboring leaves, which is required to achieve reasonable retrieval accuracy, amounts for a significant percentage of the overall query time. Further, in these approaches the descriptors of every image have to be stored, which results in a linear increase of the database size.

Accordingly, in another embodiment the present invention aims to address the challenge of rapid location recognition, and in particular to provide a location recognition system that reduces data processing time and expenses as well as data storage requirements.

SUMMARY OF THE INVENTION

The present invention is recited in the independent claims. Preferred, non-limiting embodiments are recited in the subclaims.

DESCRIPTION OF EMBODIMENTS OF THE PRESENT INVENTION

Bag-of-Features Approach

Figure 1:
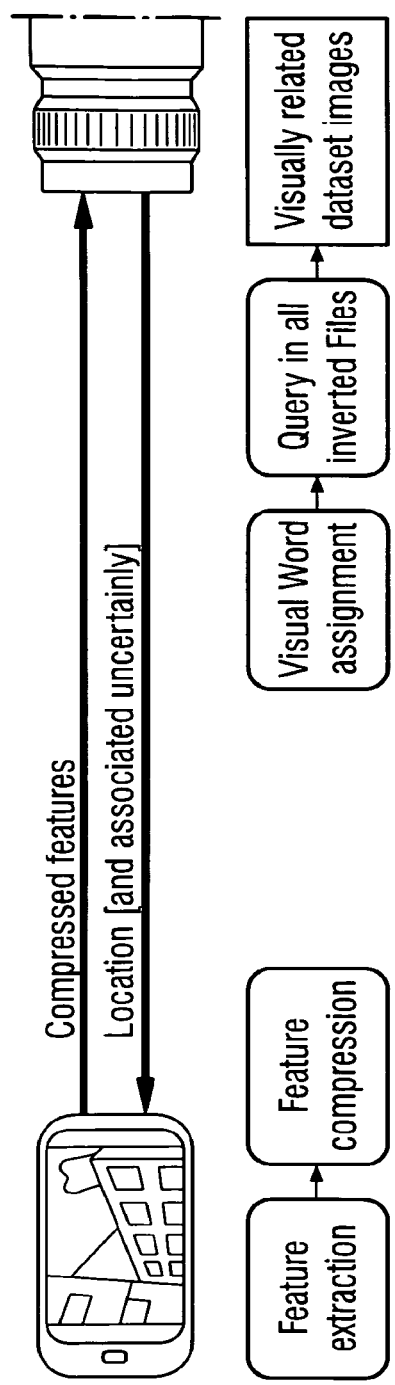
FIG. 1 is an overview of a basic visual location system.

FIG. 1 illustrates a basic architecture of a visual location recognition system which is in principle similar to that of a mobile visual product search system, with the difference that not a single image but a continuous sequence of images is used to query a reference database. As a first step, robust local features are extracted from the individual video frames to distinctively describe their content. Once the features are extracted, they are sent to the server where content based image retrieval algorithms (CBIR) are employed to identify the visually most similar reference image in the database.

Figure 2:
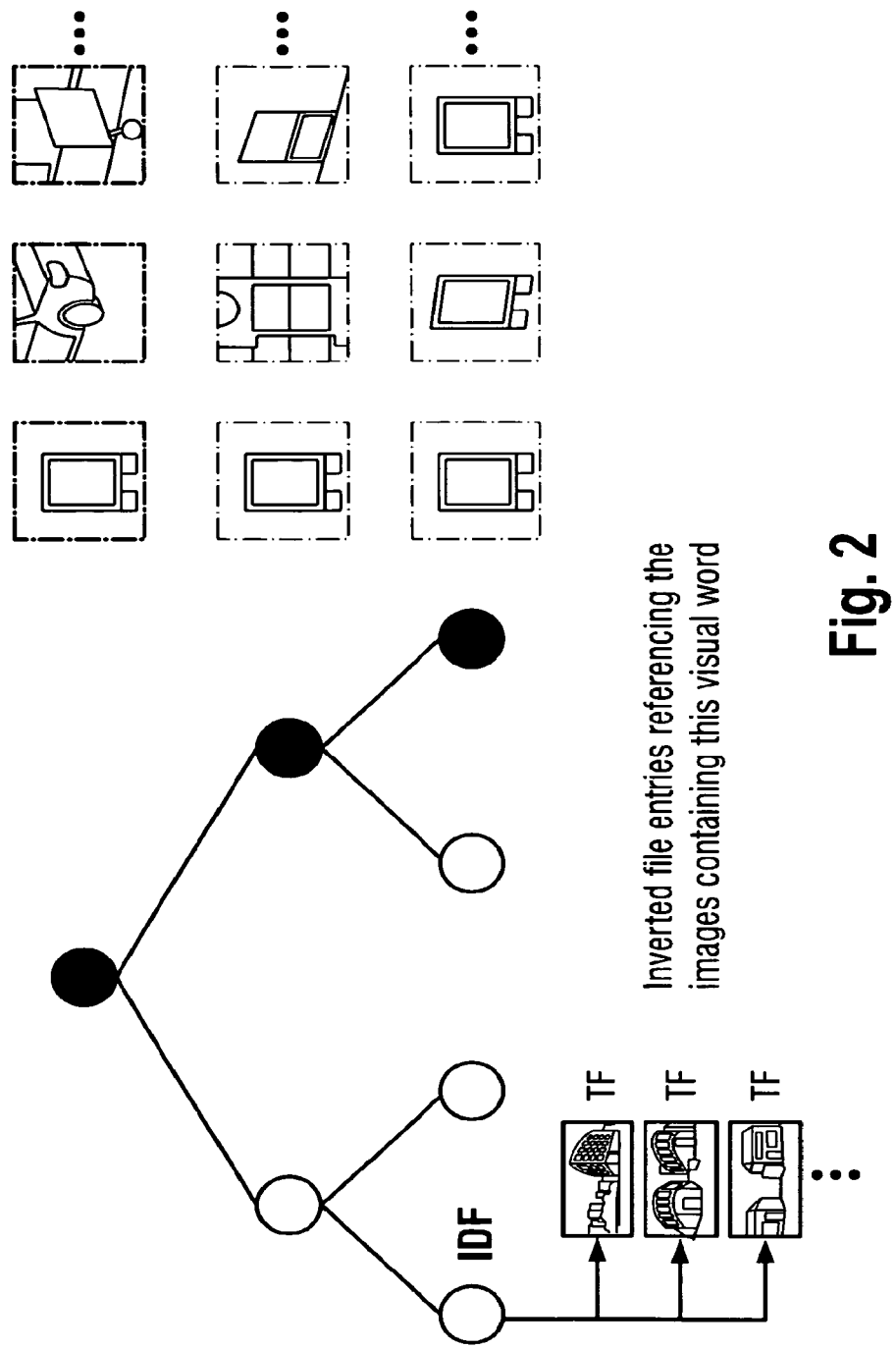
FIG. 2 is an illustration of a tree-based BoF quantization and indexing structure. Image patches assigned to a single node decrease in diversity with increasing descriptor quantization. The leaf nodes are defined as visual words with associated inverted files. These reference the images to be scored when a query image patch is quantized to the respective word.

One approach to this is the Bag-of-Feature (BoF) approach as illustrated in FIG. 2. The BoF approach reformulates the image retrieval problem into a text retrieval problem by quantizing the high-dimensional feature descriptors into so called visual words with the aid of the k-means algorithm. At fine quantization, descriptors associated to a word follow a texture pattern that is sufficiently represented by their mean. Thus, an image is no longer represented by its descriptors but by a visual word frequency histogram, the so called Bag-of-Features (BoF) vector. Similarity between two images is measured by the distance between their BoF vectors, which can be efficiently computed using inverted files. The major advantages of BoF based image retrieval are its compactness, the reduced storage requirements, and the low query times.

Feature Extraction and Selection

It has been found that detectors arranged to find distinctive image patches based on the texture produce a high number of features belonging to plants (e.g. foliage), which are unreliable due to the constantly changing texture and seasonal changes. According to an embodiment of the invention, retrieval performance is improved by excluding those features based on the color distribution of the corresponding image patch, which is mostly green. Hence, not only the quantization, indexing, and verification but also the selection of features is a major issue in visual location recognition. The selection of the most relevant features increases the performance and reduces the amount of data to be transmitted. Further, rotation invariance of the descriptor is not required as it can be assumed that database as well as query images are recorded upright or rotated by 90°. This not only significantly reduces the extraction time on the mobile device but also increases the distinctiveness of the descriptors.

Adaptive Partial Vocabularies

It has been found that the performance of a BoF-based mobile location recognition system can be improved based on the above mentioned feature selection and by making use of prior knowledge of the user's location. For example, vague prior knowledge on the location of a mobile device can be derived from cell-IDs. This can be exploited to increase the precision, reduce complexity and limit the requirements on the scalability of the adopted location recognition approach.

Furthermore, by transferring only selected features from the client to the server, the overall latency can be reduced. Still, this may not sufficient for some visual location recognition applications. Ideally, a user is notified about a LBS in the very moment the camera records the corresponding store, exhibit, trademark, etc. Due to the rapidly changing field of view and dynamically changing user attention, very low system latency is essential for LBS to be perceived as useful. With the basic system architecture shown in FIG. 1 the response time always suffers from the round trip time, which ranges between 0.3 and 0.9 seconds on 3G networks, and timeouts in addition to the time required to actually transfer the data. The architecture almost exclusively uses the slower uplink channel for uploading query features, whereas the downlink is usually more than 5 times faster. Further, the selection of features to be transferred can hardly be based on database statistics, as this would require the quantization into visual words.

Figure 3:
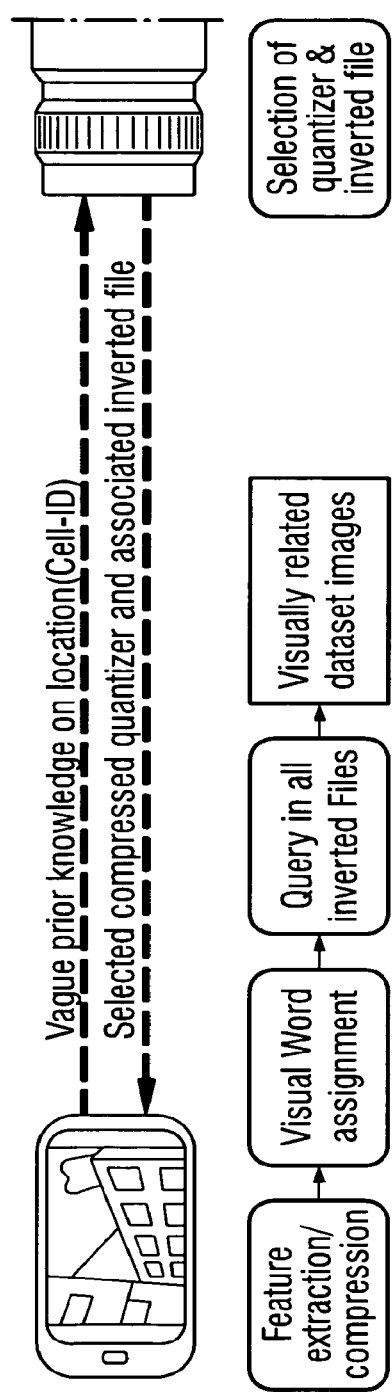
FIG. 3 is an Overview of a visual location recognition system where the retrieval task is shifted from the server to client by transferring the quantizer and compressed inverted file system of the most suitable subregion. Dashed lines indicate the data transmission during initialization. Once the transfer of quantizer and inverted file is finished no further network delay is introduced.

A possible approach to solve this problem is to transfer the quantizer as well as the inverted file to the client and perform the location retrieval exclusively on the mobile device as shown in FIG. 3. With the approach described above to integrate prior knowledge, the size of the inverted file system may be reduced. In addition, suitable compression may be applied. Nevertheless, although this approach eliminates the network delay by performing the location retrieval step on the mobile device, the amount of data to be transmitted via the downlink may result in a time consuming initialization of the system. During this phase, localization may need to be performed according to FIG. 1, where features are sent to the server and the position can be updated periodically.

According to a preferred embodiment of the present invention, based on the features transmitted from the mobile device to the server, the location of the client is periodically estimated at the server. This allows for a high performance with respect to precision and recall. With these periodic location estimates (e.g. every 3 seconds) only the reference data within a certain vicinity at the mobile device is needed for a local refinement of the location estimate. This is usually only a fraction of the full vocabulary and inverted file system.

If $F=\{f_1, f_2, \ldots, f_N\}$ is considered to be the set of features of one query frame and $V=\{v_1, v_2, \ldots, v_L\}$ to be the set of visual words (i.e., the full vocabulary), the quantization function $q_v(f_i)=v_j$ assigns each feature $f_i$ to a visual word $v_j$ in the full vocabulary V. Hence, $Q(F|V)=\{v=q_v(f)| f \in F)\}=V_F \subseteq V$ determines the subset of visual words which represents a particular video frame. If instead of the full vocabulary only a random partial set of visual words $v_R \subseteq v$ is used the feature quantization result will be different in most cases. However, using the subset of visual words representing the frame itself $V_F=Q(F|V)$ as the partial vocabulary would not change the result of the quantization as shown in Eq. 1.

$$Q(F|V_F)=Q(F|V) \qquad (1)$$

Hence, only this part of the full vocabulary needs to be available at the client to obtain the same results as if using the full vocabulary. However, this equation only holds for a specific set of features F and a partial vocabulary $V_F$ would need to be sent to the client for each frame. Ideally, a partial vocabulary that includes the correct visual words is identified to process multiple consecutive frames without the need to know their features apriori. Since $V_F$ can be extended by other subsets of the full vocabulary $s \subseteq v$ without changing the quantization result, as shown in Eq. 2, partial vocabularies at the client that have a sufficiently high probability of including $V_F$ can be used.

$$Q(F|V_F \cup S)=Q(F|V) \qquad (2)$$

To limit the amount of data to be transferred to the client, the smallest partial vocabulary that includes the unknown $V_F$ with high probability is identified.

Based on the periodic location estimates obtained at the server, there is prior knowledge on the location in form of the top K retrieved locations. Thus, the partial vocabulary can be based on the visual words that are part of panoramas located at these candidate locations. Features of frames recorded at these location are expected to be quantized to the corresponding visual words. Hence, the probability that $V_F$ of these frames is part of this partial vocabulary is very high.

Figure 4:
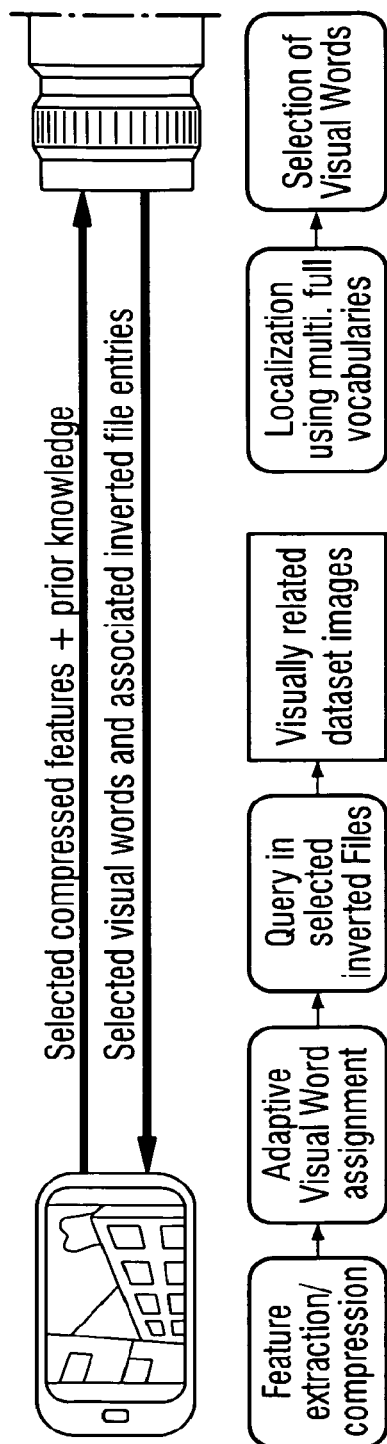
FIG. 4 is an overview of a visual location recognition system where relevant parts of the vocabulary are periodically pushed to the client. The selection of the transmitted visual words is based on the location retrieval performed at the server using the query features uploaded from the client. The pose estimation is performed on the mobile device utilizing these preloaded adaptive partial vocabularies. Blue lines indicate that the network delay does not influence the time required for the location recognition.

Hence, according to an embodiment it is envisaged to periodically send only these relevant visual words together with their associated inverted files to the client to allow for a local pose estimation on the mobile device within a limited area as shown in FIG. 4. This is achieved by matching query features on the mobile device to the partial vocabulary.

For example, this can be performed at about 10 fps. At an average motion of 1.2 m/s the visual words of two neighboring panoramas (distance ranging between 12-17 m) this would allow for a navigation of at least 10 seconds or 100 frames without an update of the partial vocabulary. Due to imperfect location retrieval at the server and/or degenerated query features sent, the probability that the first ranked panorama is located at the actual location is about 60%. To achieve a probability of about 90% the top 5 ranked panoramas need to be considered to build a partial vocabulary.

It has been found that querying the partial vocabulary, which is based on the top K panoramas, actually results in an increased precision compared to the full vocabulary. This is due to the fact that with a high probability the correct location is among the top K results, but possibly not at the beginning of this ranking. As the partial vocabulary constrains the set of possible location candidates, the quantization of the features of a subsequent query frame to this vocabulary can be considered as a resorting among the original top K results. The panorama that fits best to both queries is implicitly ranked highest.

As described above, features that vote for one of the preselected locations are matched to the same visual words as if using the full vocabulary. Only those features that refer to other locations with the full vocabulary can happen to be matched to a different visual word when considering a partial vocabulary. Applying a threshold on the maximally accepted distance between the feature and the visual word results in a marginal further improvement.

Thus, the adaptive vocabulary is based not on all visual words already transferred to the mobile device but only those that provide a sufficiently high probability of including the correct location.

To make best use of the available data rate of the downlink, a priority queue of locations and their visual words is updated every time a new set of features is sent from the mobile device to the server. Thus, those visual words that belong to the panoramas with the highest probability of representing the actual location are constantly sent. This probability can be determined based on the score of the retrieval or with the aid of temporal filtering approaches like Bayesian filters. For example, with a 3G downlink, the visual words and associated inverted file entries of at least 2 panoramas (each comprising approximately 1000 visual words) can be transferred per second. Within the time a feature set is uploaded we can download the visual words of about 6 locations.

As more and more visual words are transferred to the client, the chances that visual words in the priority queue are already available at the mobile device increase and hence they do not have to be sent again. To increase the time the client can navigate based on the partial vocabulary, visual words of panoramas that are adjacent to the top K location estimates are added to the priority queue. Since they significantly overlap with respect to the visual words, only a limited amount of additional data has to be transferred. To speed up the quantization of feature descriptors to the adaptive partial vocabulary, which includes at most 50 k visual words if the uncertainty about the actual location is large, randomized kd-trees are sent to the mobile device. As they require about 10 KB each (for 50 k visual words), a frequent update can be carried out.

Hyperplanes and Overlapping Buffers

In another embodiment the present invention uses a novel approach for rapid mobile location recognition which is based on what is referred to as Multiple Hypothesis Vocabulary Tree (MHVT). The MHVT maximizes the probability of assigning matching descriptors to the same visual word while minimizing the query time. This is achieved by introducing an overlapping buffer around robustly determined separating hyperplanes to allow for a soft quantization and an adaptive clustering approach.

Based on this approach, a high accuracy and performance can be achieved without requiring search tree backtracking.

In particular, a quantization structure to visual vocabularies may be employed that includes overlapping buffers, thereby to decrease the query time substantially in high dimensional spaces. Database descriptors are allowed to follow the hypothetical paths through a binary search tree that a matching query descriptor could traverse. Thus, the probability of quantizing a matching descriptor and the query to the same leaf of the binary search tree is significantly increased while minimizing the loss in distinctiveness of the visual words. This stands in contrast to conventional hierarchical scoring, as the scoring energy is concentrated to the leaf nodes. Hence, time consuming memory access can be avoided.

Moreover, instead of applying a large branching factor k, intended to improve quantization in k-means trees, the structure is limited to a binary tree to minimize the query time. The ratio between the required query vector comparisons for a binary tree relative to a tree with branching factor k is given by Equation (3), where L corresponds to the depth of the k-ary tree:

$$\frac{Comp_{binary}}{Comp_{k\text{-}ary}} = \frac{\log_2(k^L)}{k \cdot L} = \frac{\log_2(k)}{k} \qquad \text{Equation (3)}$$

Accordingly, the performance of the quantization structure is substantially improved by optimizing the determination of separating hyperplanes, as described in more detail below.

In a preferred embodiment, the present invention comprises weighting visual words corresponding to the properties of the query descriptors in an inverted file scheme. In particular, as in vocabulary trees a quantization into corresponding image textures instead of a fixed number of nearest neighbors has to be performed, a strategy to avoid overfitting of descriptor clusters is employed. To integrate knowledge on the importance of query descriptors, a framework is employed that performs a weighting of visual words within an inverted file scheme. This allows accounting for the probability of incorrectly quantizing a query descriptor and effectively matching camera images with panorama views, as described below.

In another preferred embodiment, the present invention comprises proposed spatial database segmentation and a fusing scheme facilitate the integration of prior location knowledge to increase retrieval precision. By segmenting the search space into multiple overlapping regions and fusing the results of the corresponding vocabulary trees, an increase in precision is achieved while adapting the utilized resources to the current uncertainty about the position of the user. This concept facilitates the integration of prior location information.

More particularly, according to an approach employed in an embodiment of the present invention, hyperplanes separate the nodes of the decision tree into two mutually exclusive child nodes. Overlapping buffers are introduced in order to prevent a separation of descriptors too close to the hyperplanes, i.e. descriptors that cannot be clearly distinguished. Such descriptors are stored in overlapping buffers. Thus, descriptors in the overlapping buffers are not separated from each other at the current node. Instead they are assigned to both child nodes.

Figure 5:
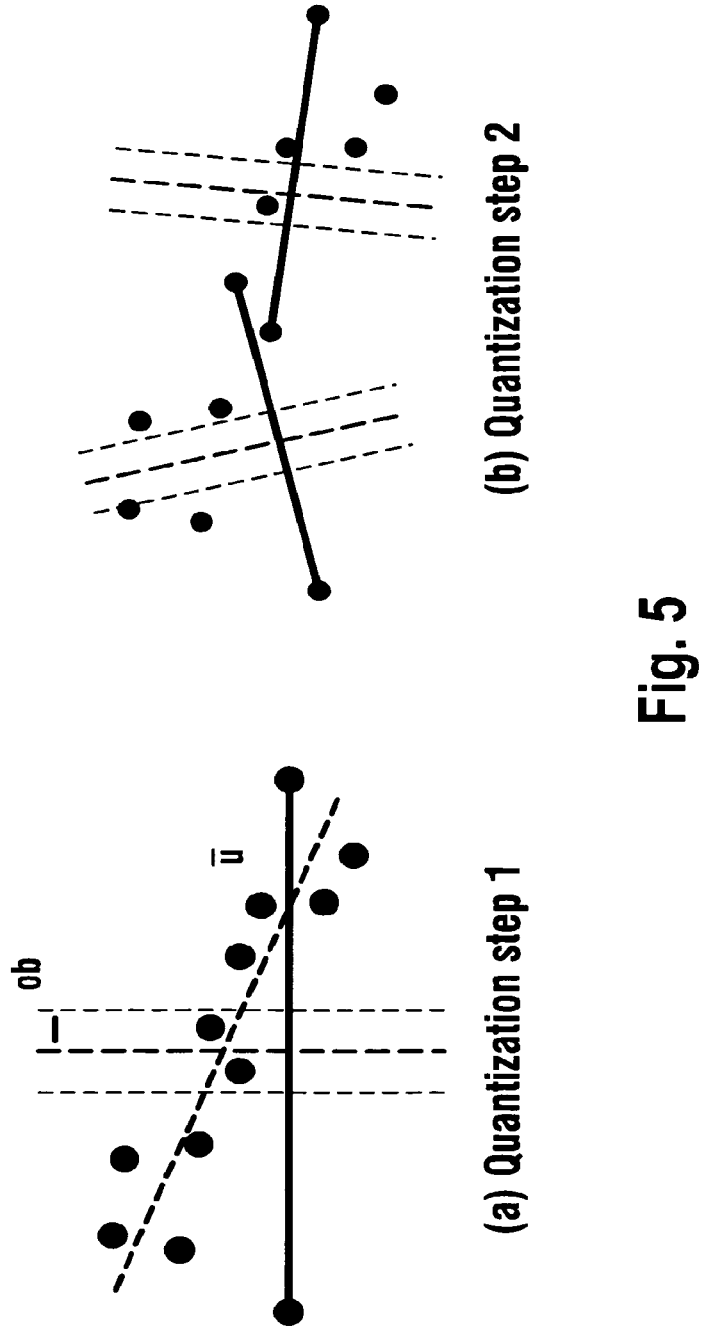
FIGS. 5 to 9 relate to embodiments of the present invention including a novel approach for rapid mobile location recognition which is based on what is referred to as Multiple Hypothesis Vocabulary Tree (MHVT).

In particular, the search tree may be based on metric-trees that organize d-dimensional data hierarchically by separating the space iteratively with hyperplanes. As is illustrated in FIG. 5, at each node, a vector $\vec{u}$, spanning between the two mutually farthest points (pivots), and the mean or median of all data points projected onto $\vec{u}$, are determined. Thus, $\vec{u}/\|\vec{u}\|$ is the normal vector of the hyperplane that separates the node at the mean or median resulting in two mutually exclusive child nodes. The process proceeds recursively until the number of data points is less than the defined maximum, the so-called naive count. This count represents the maximum number of descriptors that will be considered for linear search once a query investigates a particular leaf node.

During the decision process, a query descriptor proceeds down the tree to evaluate on which side of the hyperplane it is lying. Descriptors lying close to the splitting boundaries have a high probability of matching to a descriptor in the neighboring node and would normally require backtracking to be found. In order to avoid this, an overlapping buffer around the boundary is introduced. FIG. 5 illustrates the quantization with overlapping buffers. All database descriptors projected inside the buffer are assigned to both child nodes as long as their number does not surpass a certain fraction $\rho$ of the descriptors in the mother node. Hence, descriptors that cannot be clearly distinguished by the current decision boundary are not separated from each other at the current node. The differentiation is delayed to the child nodes where the probability of lying far from the separating hyperplane is high. As the nodes are no longer mutually exclusive, increased memory requirements are entailed which are bounded by the ratio $\rho$. The maximum tree depth is given in the following equation, where N is the overall descriptor count and n the naive count:

$$depth_{max} = \frac{\log(n/N)}{\log(p)} \qquad \text{Equation (4)}$$

In order to achieve an efficient clustering, the vector u should separate the data points along the direction of largest variation (dashed transverse line in FIG. 5a). However, as shown in FIG. 5a, the vector spanned by the two mutually farthest points (solid horizontal line) does not necessarily fulfill this task as it is very sensitive to outliers. This is especially true if the data has already been split along multiple axis and the variation is increasingly isotropic. Further, to determine the pivots with linear time requirements, approximations are utilized that again suffer from outliers.

Due to the introduction of overlapping buffers, the performance of the hybrid spill tree may be sensitive to the determination of the direction of maximum variation. This may affect not only the robust assignment of matching descriptors to the same child node but also the effectiveness of the overlapping buffers. These effects may be amplified in high dimensional spaces. Hence, a robust, precise but yet simple algorithm to determine the splitting axis is required to optimize the quantization performance may be desirable.

Satisfactory results can be achieved by spanning the vector u between the two farthest point cluster centers with round ($\sqrt{n} \cdot c$) descriptors per cluster, where n is the number of descriptors in the node and c should be in the range of approximately 25%. These centroids are less susceptible to outliers and can be estimated in an approximate manner. This is done by starting at a random point and finding its most distant point, which in turn is used to find its round ($\sqrt{n} \cdot c$) farthest points. Based on the mean of this cluster, again the farthest cluster is determined and a mean is computed. This process is approximative, similar to the original node partitioning method and can be run fast if ($\sqrt{n} \cdot c$)<<n using the heap sort algorithm in at most O (n log ($\sqrt{n} \cdot c$)) steps.

With this improved projection axis u, a better retrieval accuracy can be achieved without backtracking. Further, also with backtracking the performance is significantly improved. If the time required to build the tree is not relevant and the database is not too large, the optimal splitting axis can also be determined by the eigenvector corresponding to the largest eigenvalue of the node's covariance matrix.

MHVT

According to an embodiment of the invention the advantageous properties of the overlapping buffers are transferred to vocabulary trees, resulting in a novel adaptive clustering strategy to optimize the distinctiveness of visual words. Large databases result in differently sized descriptor clusters depending on the frequency of the corresponding image textures (e.g. windows in an urban environment). Thus, using a fixed naive count to limit the quantization results is suboptimal. It is more reasonable to use the accumulated variance with respect to the dimensions of all descriptors in a node as the criterion to stop the quantization. This approach reflects the true cluster statistics, independent of the database size. However, the function used to compute the descriptor vectors from image patches is highly nonlinear, which means that pairs of equally similar image patches do not result in equally similar descriptor distances and thus variances. Hence, a common threshold on the accumulated variance does not achieve a fair quantization among the clusters.

The shape of the hyper-ellipsoid comprising the descriptors of a node indicates whether multiple distinct clusters are contained, which can be approximated with the distribution of the variance among the dimensions. Hyper-ellipsoids with almost equal variance in the first principal components (close to hyperspheres) can be assumed to contain only one distinct cluster. In contrast to the accumulated variance, this distribution is not depending on the nonlinear mapping of the descriptors. Further, it is not even necessary to compute this high dimensional variance distribution, as the separability and thus the shape of a node can be determined by the percentage of descriptors lying in the overlapping buffer. If it is above a certain threshold, the shape is close to a hypersphere, and the quantization process can be stopped for that node. Thus, an overfitting of descriptor clusters can be effectively avoided resulting in smaller trees with significantly increased performance. With this modification, the tree is built according to the definition of splitting axis described above. Based on this indexing structure, the registration of the database images follows as described in Algorithm 1:

---

Algorithm 1 Register images

For each image I
    Initialize normalization vector $\bar{n} := \bar{0}$
    For each feature $\bar{f}$
        Propagate $\bar{f}$ down the tree, including paths
           reached because of spills
        At each node i increase inverted file entry
           $d_i(I)$ by $IDF_i$
        At nodes i along the likeliest path increase
           $n_i(I)$ by $IDF_i$
    Nomalize $\bar{d}(I)$ by dividing by $||\bar{n}(I)||_p$

---

At this point, it is assumed that the IDFs of every node have already been determined during the tree building process. Each feature descriptor of every database image is propagated down the tree resulting in multiple paths and parallel inverted file entries if the descriptor is at least once assigned to an overlapping buffer. Instead of assigning all descriptors to multiple leaf nodes whose centroids are closer than a certain threshold, database descriptors are allowed to follow only hypothetical paths that a query descriptor could traverse. Thus, the probability of finding the matching descriptor in the leaf the query has been assigned to, is significantly increased while minimizing the loss in distinctiveness of the nodes.

To allow for a fair comparison between images of different descriptor counts, the BOF vectors have to be normalized to length one. However, including the contribution of multiple hypothetical paths will increase the norm relative to the properties of the tree, not necessarily to the properties of the descriptors. This would also decrease BOF entries resulting from descriptors lying far away from decision boundaries, which thus have not been assigned more than once. This is avoided by normalizing the BOF vector only with respect to the most likely path. This is the path the descriptor would have followed without the overlapping buffers.

As the distance between the query and database BOF vectors is calculated in an inverted file approach, only those dimensions of the vectors are compared, where both have nonzero entries and thus descriptors have scored. A query BOF vector thus compares always only to the entries in the BOF vector of reference image j that correspond to a single valid combination of hypothetical descriptor paths. All other entries are ignored as the corresponding entries in the query BOF vector are zero. Hence, querying the database with one of the referenced database images is guaranteed to result in the minimum distance.

The query process is illustrated in Algorithm 2:

---

Algorithm 2 Find matching images

Initialize query BOF vector $\bar{q} := \bar{0}$
For each feature of the query image traverse down the tree
    Increment $TF_i$ for every feature at every node i
    and add node i to a list
For every distinct node i in the list calculate
    $q_i = TF_i \cdot IDF_i$
Normalize $\bar{q}$ using $L_p$ norm
For every distinct node i in list and every image I
    in node's inverted file increase distance $\Delta'(I)$ by
    $\delta_p = |q_i - d_i(I)|^p - |q_i|^p - |d_i(I)|^p$, i.e.
    $\delta_2 = -2 \cdot q_i \cdot d_i(I)$ for $L_2$ distance and
    $d_1 = |q_i - d_i(I)| - q_i - d_i(I)$ for $L_1$ distance.
Distance $\Delta(I)$ is $2 + \Delta'(I)$ for $L_p$ norm

---

This algorithm can be further optimized for the L2 norm by partitioning the scalar product. However, due to the optimizations described below, the computation is described generalized for any Lp norm. Multiple hypothetical paths are not assigned to the query descriptor since this would increase the query time.

Visual Word Weighting

As described above, the probability of assigning a descriptor to the correct child node depends on the distance d between the feature and the separating hyperplane and the size of the overlapping buffer ob. With the aid of this buffer, the quantization effects are reduced. It is further desirable to account for the probability of assigning matching query and database descriptors to the same leaf node. To evaluate the statistics of matching SURF descriptors, an exhaustive search among the features of numerous image pairs has been performed and potential matches have been validated via spatial verification. Here, the baseline between the images was up to 11 m, which complies with the image retrieval tasks described below.

Figure 6:
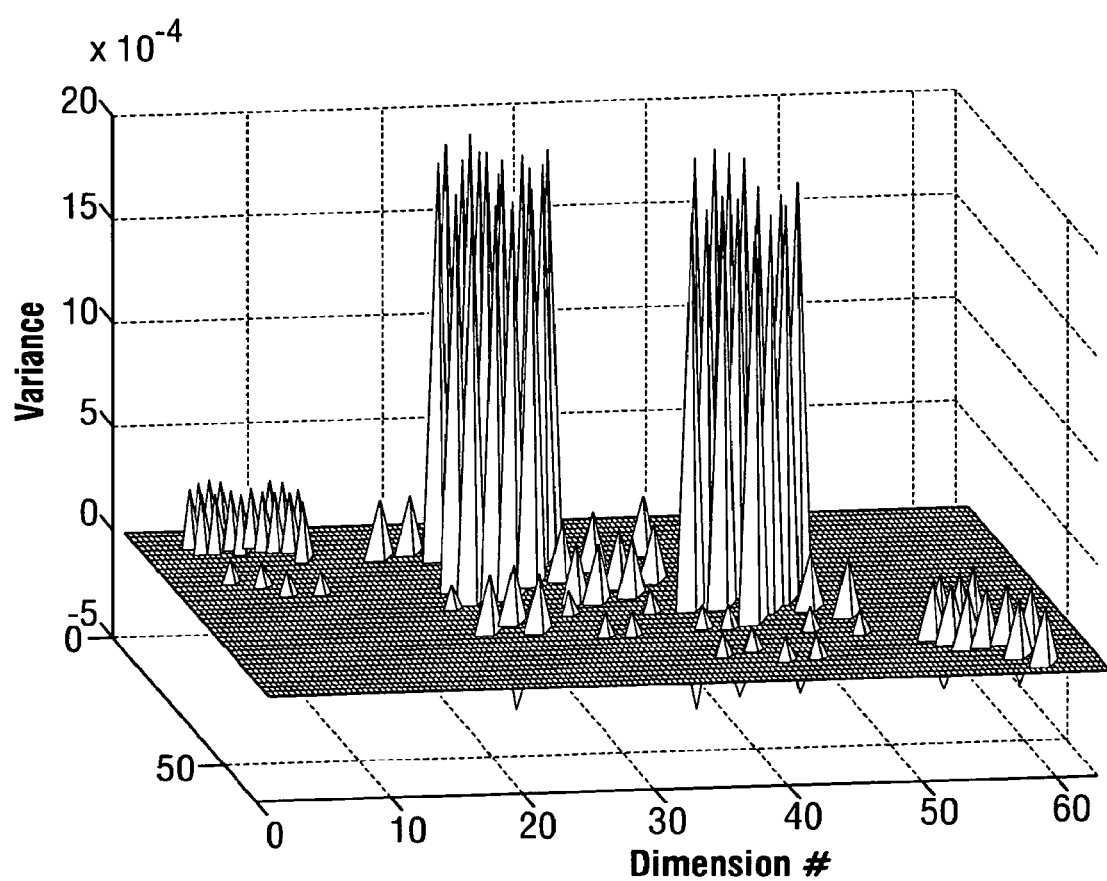

The covariance matrix of the difference vectors between matching feature descriptor pairs is illustrated in FIG. 6. It shows the strong variance differences among the dimensions caused by the spatial Gaussian weighting of the SURF descriptor. Further, only minor co-variances between the dimensions can be observed emphasizing the good properties of the descriptor.

Figure 7:
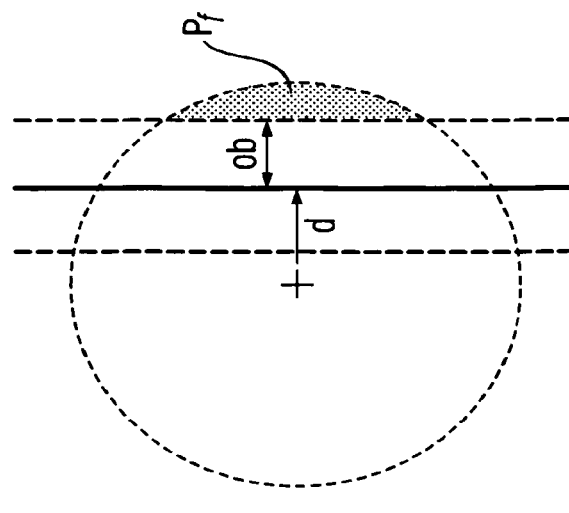
Figure 7:
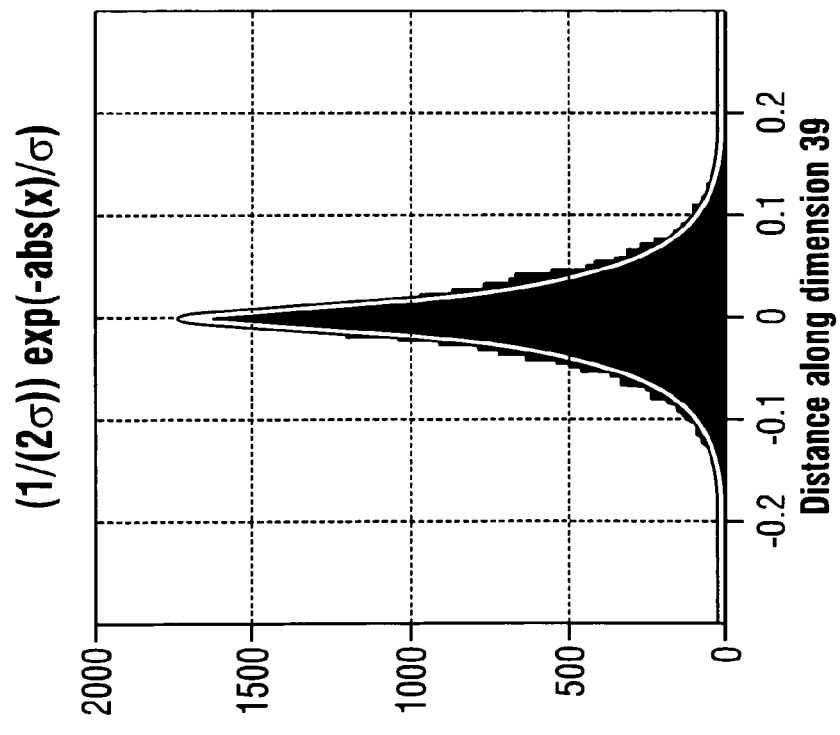

FIG. 7a shows the histogram of distance vectors, i.e., the difference of two matching descriptors, in one of the dimensions. The mean of this distribution is as expected zero, as it is the difference of two identically distributed random variables. The difference distribution along all dimensions can be best described with the aid of a Laplacian distribution (see FIG. 7a).

Thus, the probability Pf that a matching feature is "incorrectly" quantized to the neighboring child node can be determined by the cumulative 64-dimensional Laplacian distribution function. As illustrated in FIG. 7b, this probability corresponds to the integral over the gray area beyond the overlapping buffer (ob). Thus it depends on the distance d between the query feature and the separating hyperplane.

It is now assumed that the distribution of the entries of the difference vector between a query and a matching reference descriptor are independently distributed following a Laplacian distribution. Thus, only the one dimensional cumulative distribution needs to be considered to determine the probability Pf of finding a match on the other side of the buffer:

$$P_f(d) = \frac{1}{2} e^{\frac{|d+ob|}{\sigma}}; \sigma = \sqrt{\frac{\text{var}(D)}{2}} \qquad \text{Equation (5)}$$

Here, $\sigma$ is relative to the variance of the matching descriptor differences D.

The probability of assigning matching descriptors to the same visual word corresponds to the probability of quantizing matching features to the same node $(1-Pf)$ in all quantization steps m:

$$\alpha_i = \Pi_m (1-P_{fm}) \qquad \text{Equation (6)}$$

This probability $\alpha_i$ can be utilized to weight the corresponding comparisons between the query and the reference BOF vectors in the following equation:

$$\sum_i \alpha_i |q_i - d_i|^P = \qquad \text{Equation (7)}$$

-continued
$$\sum_{i|d_i=0} \alpha_i |q_i|^P + \sum_{i|q_i=0} \alpha_i |d_i|^P + \sum_{i|q_i \neq 0 \wedge d_i \neq 0} \alpha_i |q_i - d_i|^P$$

Thereby, the influence of unconfident visual word quantizations can be reduced. In this equation the comparison between a single query and database image pair is shown iterating over all dimensions of the BOF vector. To keep the query time linear with the number of query descriptors, an inverted file scheme is utilized to compute the difference between the query and database BOF vectors. In this scheme, each leaf node references the BOF vector entries di of those database images that quantized a descriptor in this leaf. While quantizing the descriptors of the query image to determine its BOF vector entries, only the BOF entries of the images that were quantized to the same leaves can be accessed. Thus, one is limited to those entries in the BOF vectors where a descriptor of both query and database image quantized into the same leaf ($q_i \neq 0$ and $d_i \neq 0$).

The sum in the above equation can be divided into three distinct parts. The third term can be easily computed as it is iterating only over dimensions where both a query and database descriptor are quantized into one leaf. In the first two terms either the database image has no entry ($d_i=0$) or no query descriptor has traversed the corresponding node ($q_i=0$).

These terms cannot be directly computed in an inverted file scheme. The first term can be expressed by the subtraction between the overall weighted sum of qi and the sum of the weighted qi at $d_i \neq 0$, which both can be computed:

$$\sum_{i|d_i=0} \alpha_i |q_i|^P = \sum_i \alpha_i |q_i|^P - \sum_{i|d_i \neq 0} \alpha_i |q_i|^P \qquad \text{Equation (8)}$$

Since in the second term of Equation (8) no weights $\alpha_i$ exist for $q_i=0$, they are set to a constant value k (Equation (9)). Similarly to the previous substitution, the second term is substituted with the subtraction between the overall sum of di and the sum of di at $q_i \neq 0$, as shown in Equation (10). Since the BOF vector q is normalized to length one, the norm is now k. Hence, only terms at $q_i \neq 0$ and $d_i \neq 0$ remain in Equation (5), which can be computed within the inverted file approach.

$$\sum_{i|q_i=0} \alpha_i |d_i|^P = \sum_{i|q_i=0} k |d_i|^P \qquad \text{Equation (9)}$$

$$\sum_{i|q_i=0} k |d_i|^P = \sum_i k |d_i|^P - \sum_{i|q_i \neq 0} k |d_i|^P = k - k \sum_{i|q_i \neq 0} |d_i|^P \qquad \text{Equation (10)}$$

The second term of Equation (7) actually accounts for those entries in the BOF vector comparison where the query image does not provide a descriptor ($q_i=0$) whereas the database image does. This is an important information on the image pair similarity if regular images are compared among each other. However, it is possible to match regular mobile device camera frames to 360° panoramas. Thus, the video frame can only be a subsection of the panorama and at most the corresponding fraction can be matched. Hence, the constant k can be adjusted that weights this second term in Equation (7) accordingly. In this case k is the ratio between the field of view of the camera image and the panorama. This novel weighting allows for effectively matching images that show completely different portions of the scene and thus increases the performance of the algorithm significantly. Generally, this framework enables integrating prior knowledge into the image matching process without increasing query time.

Geospatial Score Smoothing

Querying the panorama image database returns an ordered list of panoramas, or equivalently, as the panoramas are tagged with geographic coordinates, a list of geographic locations. For each location in the list, there is a score indicating how similar the respective location is to the query image. As adjacent locations usually share most visual features, it can be assumed that a high score for one location justifies a high score for adjacent locations, even if the image retrieval system is unable to find some of the adjacent locations due to clutter, occlusions, and other factors. Therefore, the ordered list of panoramas is processed in a way such that a fraction $f_{ij}$ of the score for each panorama $P_i$ in the result list is applied to all panoramas $P_j$ that could have been found within a predetermined radius around the panorama $P_i$. The fraction $f_{ij}$ can be determined by taking the geospatial distance between $P_i$ and $P_j$ into account, e.g., by using a Gaussian function of the distance. This way, close panoramas will be assigned a large fraction of the score, while those farther away only a small fraction. The overall score for a location is computed by adding up all weighted scores for that location (possibly including its own score if the location has been part of the query result).

The result of this processing is a new list of panorama images sorted by their respective similarity scores. Compared to the original result, the amount of false positives is greatly reduced as they usually are not supported by scores from adjacent panoramas. At the same time, the number of correctly retrieved panoramas is increased, as clusters of adjacent panoramas will take along nearby panoramas that otherwise would have been missed.

Overlapping Sub-Trees

Preferably, a system for location recognition based on visual data should not be bound to a confined area but allow for continuous and precise position estimation at any place. However, the scalability of state-of-the-art visual location recognition systems is limited to few square kilometers and performance decreases significantly once a certain limit is reached. In conventional systems, often only the most informative features are selected allowing for an increase in the number of database images by a factor of 10 resulting in approximately 2 $km^2$. However, covering a city like San Francisco with more than 100 $km^2$ is difficult and may not necessary as prior knowledge on the location usually exists. Prior information could for instance stem from the mobile Cell-ID of the network provider enabling determination of a position estimate in the range of a few hundred meters at most. Integrating this information into the location recognition process reduces the required resources with respect to memory as well as query time and increases precision.

Spatial Partitioning

Figure 8:
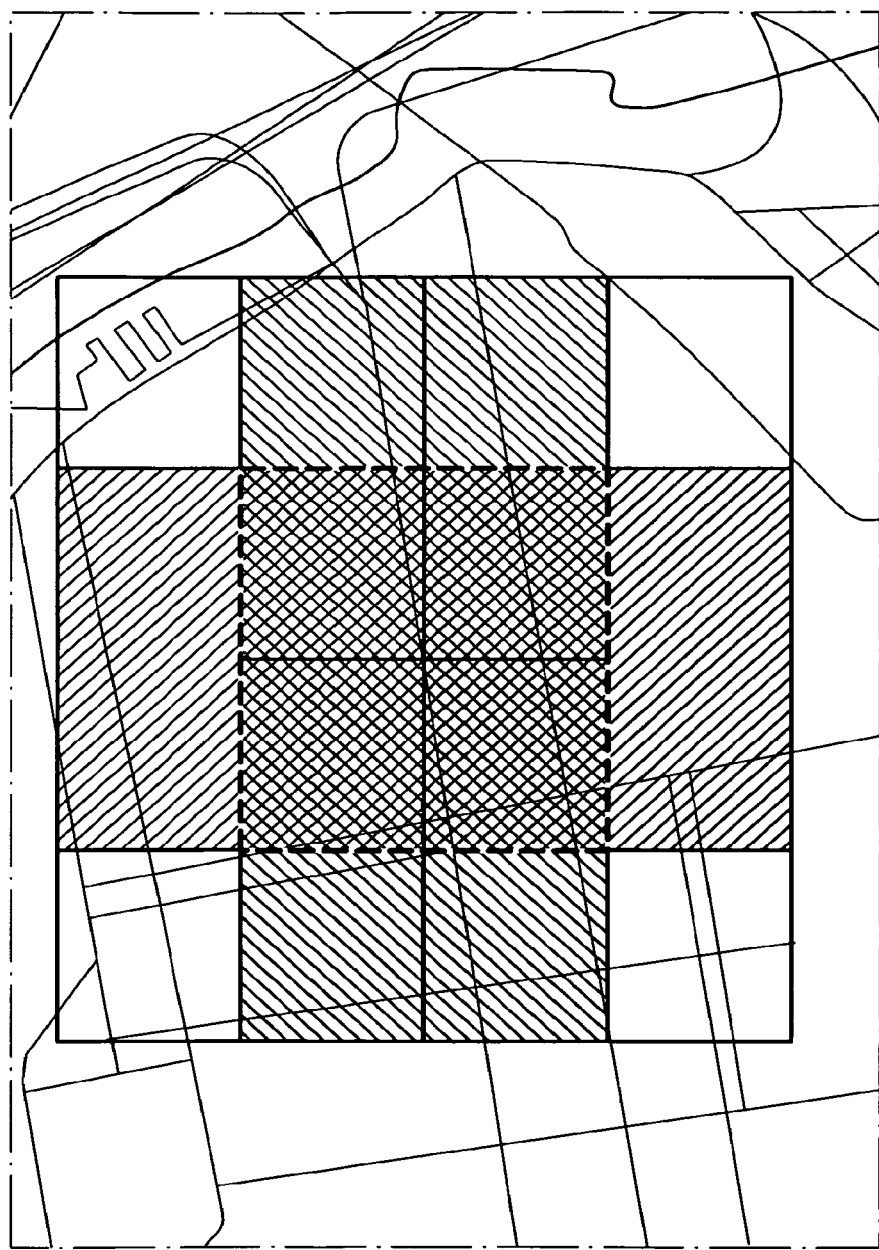

According to an embodiment of the present invention, the search area is segmented, i.e., a large environment like a city, into several overlapping sub-regions. For each of them an individual tree and associated inverted file set is generated. The size of the sub-regions can be set to approximately 2 $km^2$ depending on the expected prior location information. In the example in FIG. 8, the area in the center is surrounded by eight neighboring regions. Each of them is overlapping with horizontally and vertically adjacent regions by 50%. Thus, every distinct location is covered by four tree structures. At larger search spaces, the pattern is continued accordingly.

In the localization process only those trees are queried that comprise locations within the area of the current uncertainty about the position of the user. This results in four redundant similarity estimates per database image for one query image. Thus, the computational complexity efficiently adapts to the current prior location information. Since these similarity estimates are determined by trees built with a significantly differing image set, the quantization structure of each of them is slightly different from the others. The similarity scores are yet comparable and can be fused, as described below. This is similar to known techniques like Locality Sensitive Hashing or Extremely Randomized Forest, where the results of a large number of random quantization structures are fused. However, in contrast to these techniques, the tree is not randomized directly. Instead optimal quantization structures are computed for different image sets. Thus, combining the redundant results significantly increases the precision at the cost of increasing the query time. While scaling the computational complexity with the location uncertainty and increasing the precision, this system further enables a seamless handover to adjacent regions. Once a user is approaching the border of the currently covered search space, i.e., the area covered by four trees per sub-region, adjacent trees are preloaded. Thus, the position of the user is always close to the center of one of the trees.

Score Fusion

The fusion of the individual sub-tree results can be based not only on the returned similarity scores themselves but on the spatial relationship of the retrieved locations.

The main steps of the fusion are outlined in the following algorithm:

---
Algorithm 3 Fuse subtree similarity estimates

Select top K images retrieved from every queried subtree
For every location that is retrieved from at least 2 trees
   Calculate mean of the 2 most similar scores
   Divide the score by the number of trees voting for this -
   or adjacent locations
Determin the top K locations with the lowest final score

---

In a first step, the top K results of every queried sub-tree are selected. This number is determined by optimizing the tradeoff between retrieval precision and recall. While it may be preferable to retrieve ideally only images in the surrounding of the query (precision), it may also be desirable to retrieve as many images in the surrounding as possible (recall). Typically, K is in the range of 10 to 20 images. Subsequently, the locations that have been retrieved from at least two trees are selected to reduce the amount of unreliable matches, using the redundancy provided by the four independent quantization structures. For these locations, the mean of the similarity measures is computed based on the two most similar measures to increase robustness against outliers.

As it is likely that, due to clutter and dynamic objects in the database, not the same but adjacent locations are retrieved, the information implied in local clusters of retrieved images is of central importance. Thus, the mean similarity score of every distinct location is divided by the number of trees voting for this or adjacent locations. Finally, at most K locations sorted with respect to the final score are returned. Hence, this algorithm effectively increases the precision of the returned results by fusing the information of multiple trees at very low computational complexity. Based on these results a post-processing can be performed via geometric consistency verification. The knowledge on the spatial relation between database images can be further integrated with the aid of temporal Bayesian filtering.

Location Recognition

Figure 9:
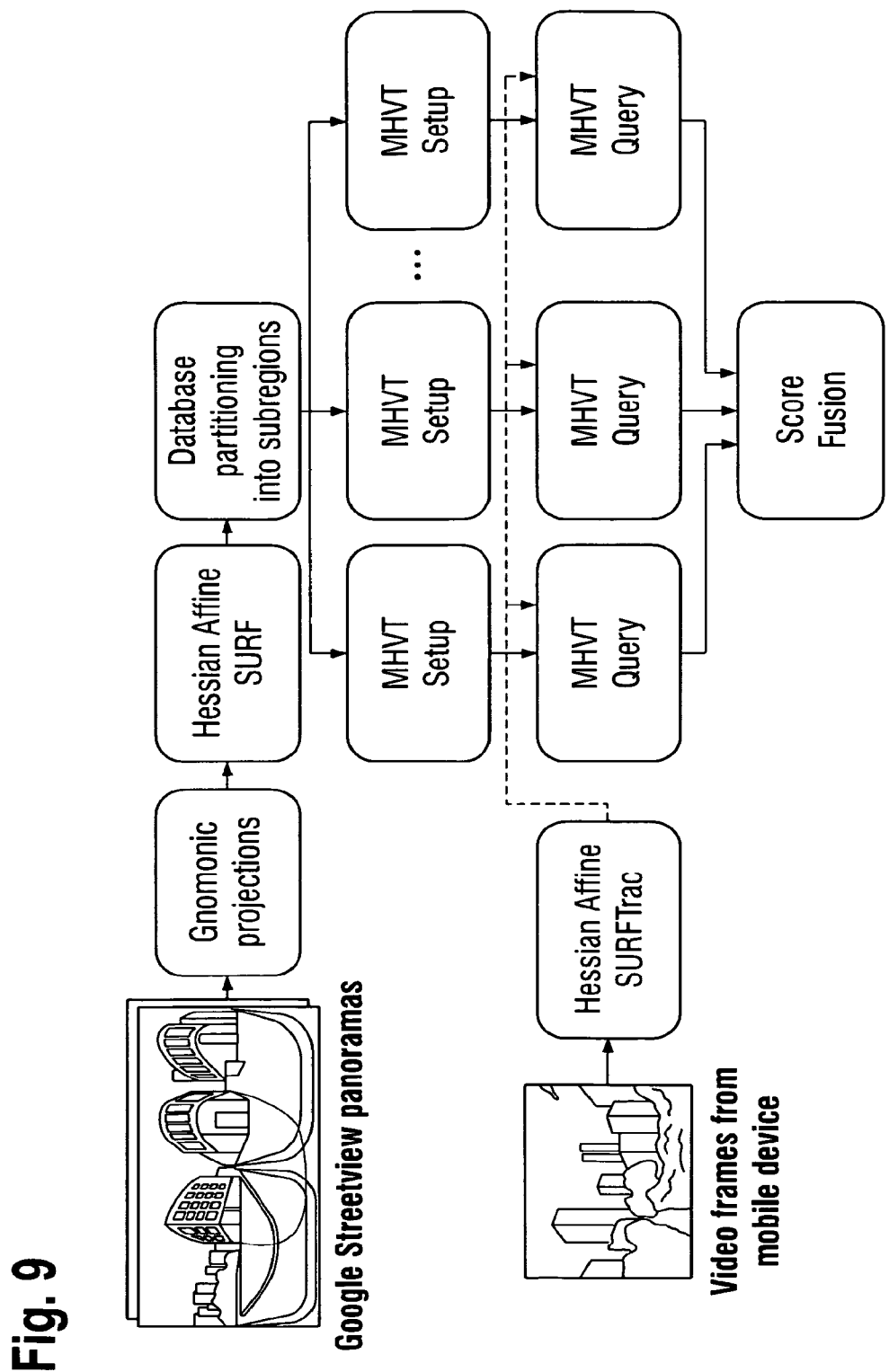

FIG. 9 illustrates a method of location recognition according to an embodiment of the invention. First, Hessian Affine interest points are extracted from 12 gnomonic projections of every panorama and modified SURF descriptors are computed. The search area is subdivided into 3 by 3 overlapping sub-regions, each covering 25% of the overall area. The individual trees are trained with the corresponding sub-region dataset and conservative quantization parameters.

As query images, video frames may be recorded by a handheld device, for example at a resolution of 640 by 480 pixels and 6 fps. To reduce the amount of clutter features queried, an efficient tracking is performed by matching the Hessian Affine operator responses instead of descriptor vectors. Only those interest points are considered that can be tracked over multiple frames, which reduces the amount of features caused by occlusions or being susceptible to affine transformations. The query is composed of all accepted features visible within the last five seconds assuming pedestrian motion. That way, small virtual feature panoramas are generated, caused by the usual camera pans.

The feature set related to the current frame is queried in all trees corresponding to a sub-region that overlaps with the current position uncertainty. Thus, regular images are matched against panoramas, allowing for an arbitrary viewing direction.

Incorrect results may be caused by locations with similar appearance. However, fusing the information of the four queried trees, as described above, effectively excludes almost all false matches. This information integration is even more effective if less optimal sub-tree results occur.

A triangulation via neighboring panoramas may be carried out to perform a final validation as well as precise location and orientation determination. Missed localizations, which occur if the query feature set is degenerated, may be overcome with the aid of probabilistic filtering and visual odometry.

Additional Embodiments

In one embodiment there is provided a visual localization method comprising: providing access to a database that is maintained by: electronically storing a plurality of images in a database, wherein each of the stored images is associated with a location, and wherein each of the stored images is represented by a reference vector indicative of the frequency of visual words in the respective image; determining descriptors corresponding to visual features in the plurality of stored images; generating a binary search tree by quantizing the descriptors to obtain a plurality of visual words corresponding to nodes of the binary search tree, comprising: determining a hyperplane for each node to separate the child nodes of the respective node; and storing descriptors that are within a distance from the hyperplane of a node in an overlapping buffer associated with that node; for a given node, terminating the quantization when reaching a predetermined quantization threshold; the visual location method further comprising: receiving one or more video frames representing a query image of the location to be recognised; determining descriptors corresponding to visual features in the query image; quantizing said descriptors to obtain a plurality of visual words; and using an inverted file index to determine an image in the database that contains said visual words and the location associated with that image.

Preferably the predetermined quantization threshold is reached when there is only a single cluster of descriptors in the given node, or the number of descriptors in the given node reaches a threshold, or a predetermined portion of descriptors has been stored in the overlapping buffer associated with the given node.

Preferably determining the hyperplane for a given node comprises determining a vector spanning between the two farthest descriptor cluster centres, preferably with round ($\sqrt{n} \cdot c$) descriptors per cluster, wherein n is the number of descriptors in the given node and c is a selectable coefficient preferably set to around 25%.

Preferably in the database an inverted file index is generated for each leaf node of the binary search tree to reference images in the database that contain visual features corresponding to descriptors quantized in the respective leaf node.

The method may also comprise a segmenting the region in which the visual location recognition is to be performed into a plurality of overlapping sub-regions.

The method may further comprise generating a respective sub-tree for each of the sub-regions, thereby providing a plurality of overlapping binary trees; and generating a respective inverted file index for each of the sub-regions.

The method may further comprise performing an approximation of the location of a user providing the query image; identifying one or more sub-regions based on the approximation; and performing a visual location recognition method of any of any preceding claim in the identified sub-region(s) only.

The method may further comprise performing a visual location recognition method of any of claims 1 to 6 in two or more of the sub-regions to obtain respective similarity measures; and fusing the similarity measures to determine a location.

The method may further comprise pre-selecting a predetermined number of the best similarity measures of every queried binary sub-tree; from the pre-selected similarity measures, selecting the similarity measures corresponding to locations that have been obtained from at least two sub-trees; for the selected similarity measures, determining the mean of the similarity measures based on the two or more most similar measures; and using the number of sub-trees pointing to an adjacent location to compute an overall similarity measure of every distinct location.

Preferably said distance is determined in accordance with a distribution of descriptors in the associated node.

The method may further comprise determining the distance between a query vector representative of the frequency of visual words in the query image and said reference vectors, wherein preferably only dimensions of the vectors are compared that both have nonzero entries.

The method may further comprise weighting the contribution of visual words to the difference between said query vector and said reference vector.

Preferably the weighting is performed in accordance with the probability that a query descriptor is allocated to the same visual word as a corresponding descriptor in the database, and/or in accordance with the reliability of a query descriptor.

The method may further comprise using the inverted file index to compute the distance between a query vector and said reference vectors.

In an embodiment there is provided an article comprising a medium storing instructions that, when executed, cause a processor-based system to perform any of the steps of the above described methods.

It will be appreciated that the above described embodiments are described as examples only, and that modifications to these embodiments are included within the scope of the appended claims.

The invention claimed is:

1. A visual localization method comprising:
   (a) maintaining, by a server, reference data that can be associated with a plurality of possible locations of a mobile device;
   (b) receiving, by the server, information about a context of the mobile device;
   (c) periodically determining, by the server based on the received information, approximate positions of the mobile device, and adaptive subsets of the reference data within vicinities of said approximate positions;
   (d) periodically pushing the adaptive subsets of the reference data from the server to the mobile device;
   (e) storing, by the mobile device, at least a portion of the adaptive subsets of the reference data received by the mobile device;
   (f) generating, by the mobile device, using interest points tracked over multiple frames recorded by the mobile device, feature data representative of one or more features detected by the mobile device;
   (g) determining, by the mobile device, location data representative of a location of the mobile device based on at least the feature data and the stored adaptive subsets of the reference data.

2. The method of claim 1, wherein said received information includes at least one query image, and determining the adaptive subsets of the reference data in step c) is based on information taken from content of the at least one query image.

3. The method of claim 2, wherein said information taken from the content of the at least one query image includes one or more of an exhibit, a store name or a trademark.

4. A mobile device pose estimation method comprising:
   (a) maintaining, by a server, reference data in a database providing a distinctive description of recorded objects;
   (b) receiving, by the server, information about a context of a mobile device;
   (c) periodically determining, by the server, based on the received information, adaptive subsets of the reference data;
   (d) periodically pushing the adaptive subsets of the reference data from the server to the mobile device;
   (e) storing, by the mobile device, at least a portion of the adaptive subsets of the reference data;
   (f) generating, by the mobile device, using interest points tracked over multiple frames recorded by the mobile device, feature data representative of one or more features detected by the mobile device;
   (g) estimating, by the mobile device, the pose of the mobile device based on at least the feature data and the stored adaptive subsets of the reference data.

5. The method of claim 4, wherein said received information includes at least one query image, and determining the adaptive subsets of the reference data in step c) is based on information taken from content of the at least one query image.

6. The method of claim 5, wherein said information taken from the content of the at least one query image includes one or more of an exhibit, a store name or a trademark.

* * * * *